(12) United States Patent
Clevorn et al.

(10) Patent No.: US 9,660,711 B2
(45) Date of Patent: *May 23, 2017

(54) COMMUNICATIONS TERMINAL, AND A METHOD FOR SELECTING A TRANSMIT ANTENNA FOR A TRANSMISSION TO A RADIO COMMUNICATIONS NETWORK

(71) Applicant: INTEL DEUTSCHLAND GMBH, Neubiberg (DE)

(72) Inventors: Thorsten Clevorn, Munich (DE); Christian Drewes, Germering (DE); Jan Ellenbeck, Gruenwald (DE); Juergen Kreuchauf, San Francisco, CA (US)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,651

(22) Filed: May 24, 2016

(65) Prior Publication Data

US 2016/0269086 A1 Sep. 15, 2016

Related U.S. Application Data

(63) Continuation of application No. 13/772,529, filed on Feb. 21, 2013, now Pat. No. 9,379,788.

(51) Int. Cl.
*H04B 7/04* (2006.01)
*H04B 7/06* (2006.01)
*H04B 7/08* (2006.01)

(52) U.S. Cl.
CPC ............. *H04B 7/0608* (2013.01); *H04B 7/04* (2013.01); *H04B 7/061* (2013.01); *H04B 7/0842* (2013.01)

(58) Field of Classification Search
CPC .... H04B 7/0413; H04B 1/401; H04B 1/1027; H04B 7/0608; H04B 7/0814; H04W 52/245

See application file for complete search history.

(56) References Cited

U.S. PATENT DOCUMENTS

| | | | | |
|---|---|---|---|---|
| 2011/0176595 A1* | 7/2011 | Duan | ................... | H04B 7/0632 375/224 |
| 2012/0281783 A1* | 11/2012 | Cheng | ................. | H04B 7/0456 375/295 |
| 2013/0053050 A1* | 2/2013 | Kang | ..................... | H04B 7/022 455/452.1 |
| 2013/0163537 A1* | 6/2013 | Anderson | ......... | H04W 72/1284 370/329 |
| 2013/0258868 A1* | 10/2013 | Davis | .................. | H04B 7/0689 370/252 |
| 2013/0308477 A1* | 11/2013 | He | ....................... | H04B 7/0608 370/252 |
| 2013/0309981 A1* | 11/2013 | Ngai | ................... | H04B 7/0404 455/78 |

* cited by examiner

*Primary Examiner* — Daniel Washburn
*Assistant Examiner* — Eboni Hughes
(74) *Attorney, Agent, or Firm* — Viering, Jentschura & Partner mbB

(57) ABSTRACT

A communications terminal may include: a plurality of antennas; and a selection circuit configured to select at least one antenna of the plurality of antennas as a transmit antenna for a transmission to a radio communications network, wherein a selection of the transmit antenna may be based on a selection criterion.

44 Claims, 5 Drawing Sheets

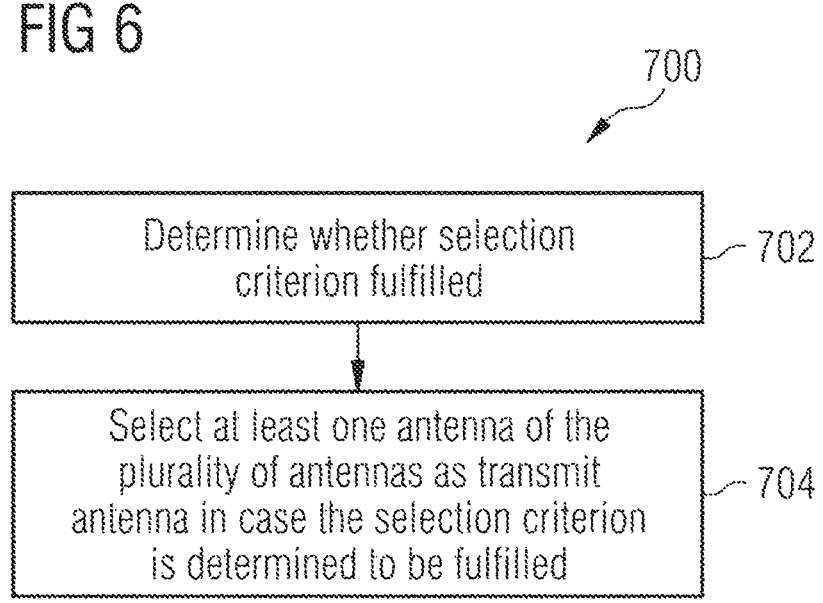

COMMUNICATIONS TERMINAL, AND A METHOD FOR SELECTING A TRANSMIT ANTENNA FOR A TRANSMISSION TO A RADIO COMMUNICATIONS NETWORK

CROSS-REFERENCE TO RELATED APPLICATIONS

This application is a continuation of U.S. Ser. No. 13/772,529 filed on Feb. 21, 2013 and entitled "A COMMUNICATIONS TERMINAL, AND A METHOD FOR SELECTING A TRANSMIT ANTENNA FOR A TRANSMISSION TO A RADIO COMMUNICATIONS NETWORK", the contents of which are incorporated herein by reference in their entirety.

TECHNICAL FIELD

Various aspects relate to a communications terminal and a method for selecting a transmit antenna for a transmission to a radio communications network.

BACKGROUND

Devices operating in, for example, a radio communications network, may be equipped with two or more antennas. Signals may not be transmitted and/or received on the two or more antennas of the device with, for example, identical data throughputs and/or powers. In other words, the two or more antennas of the device may exhibit differences (e.g. in data throughputs and/or transmit and/or receive powers). For example, the differences among the antennas may be a result of, for example, an object (e.g. a hand and/or a head of a human user) covering at least one antenna of the device. By way of another example, the differences among the antennas may be a result of, for example, the two or more antennas having different polarizations and/or alignments. Differences among the antennas may be exploited in order to, for example, increase data throughput of the device and/or to conserve battery consumption by the device and/or to optimize the use of network resources (e.g. time slot, frequency bandwidth, channel access code, etc.) in the radio communications network.

SUMMARY

A communications terminal is provided, which may include: a plurality of antennas; and a selection circuit configured to select at least one antenna of the plurality of antennas as a transmit antenna for a transmission to a radio communications network, wherein a selection of the transmit antenna may be based on a selection criterion.

A method for selecting a transmit antenna for a transmission to a radio communications network is provided, which may include: determining whether a selection criterion is fulfilled; and selecting at least one antenna of the plurality of antennas as the transmit antenna in case the selection criterion is determined to be fulfilled.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 6 shows a method for selecting a transmit antenna for a transmission to a radio communications network.

DESCRIPTION

Figure 1:
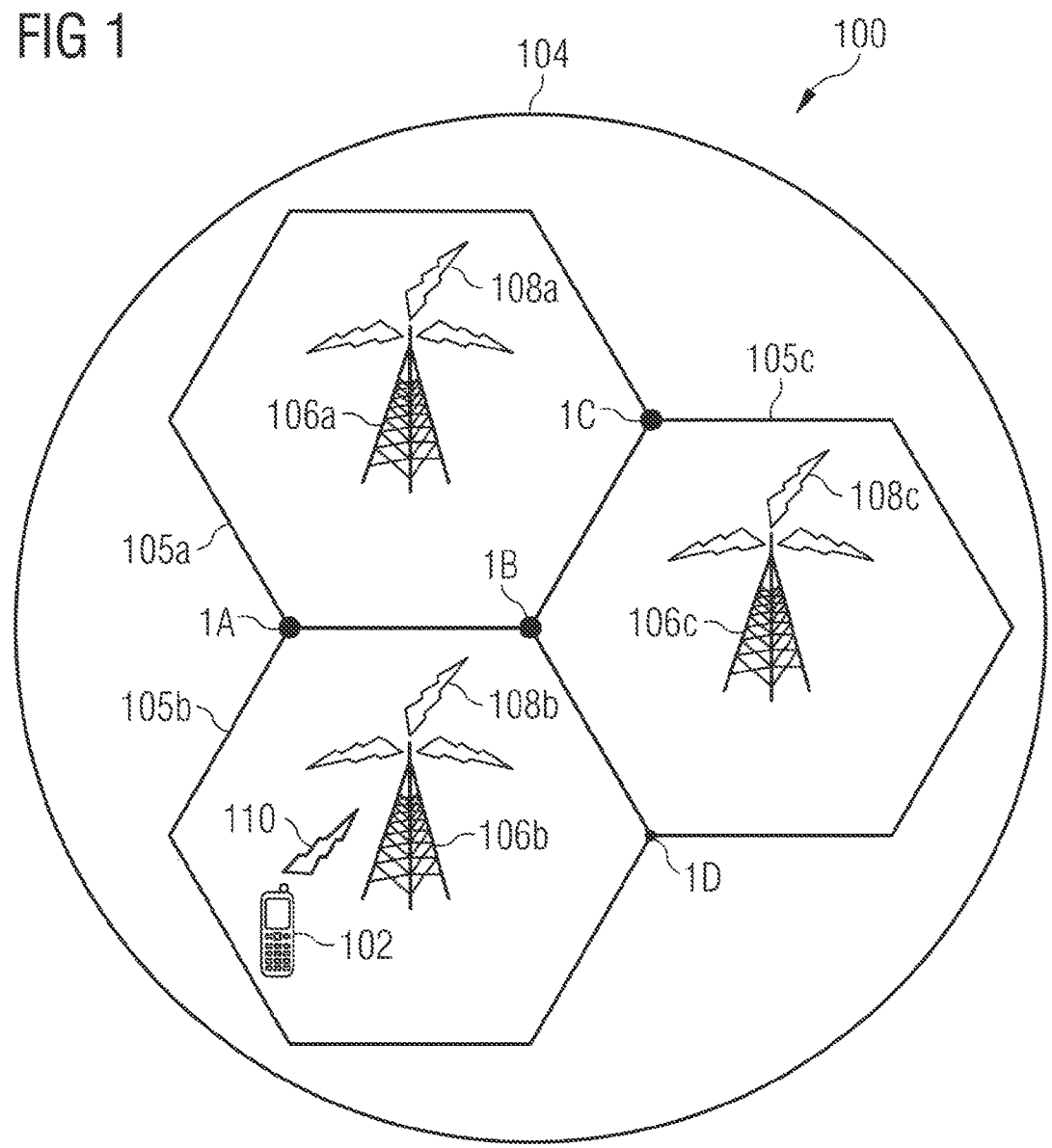
FIG. 1 shows a communications system.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described for structures or devices, and various aspects are described for methods. It may be understood that one or more (e.g. all) aspects described in connection with structures or devices may be equally applicable to the methods, and vice versa.

The word "exemplary" is used herein to mean "serving as an example, instance, or illustration". Any aspect or design described herein as "exemplary" is not necessarily to be construed as preferred or advantageous over other aspects or designs.

The term "radio communications network" is used herein to refer to a radio communications system configured in accordance with the network architecture of any one of, or any combination of, LTE (Long Term Evolution) cellular communications technology, UMTS (Universal Mobile Telecommunications System) cellular communications technology which may include the system enhancement HSPA (High Speed Packet Access), GSM (Global System for Mobile Communications) cellular communications technology which may include system enhancements General Packet Radio System (GPRS) and Enhanced Data rates for GSM Evolution (EDGE) and CDMA2000 (Code Division Multiple Access) cellular communications technology, although other radio communications technology may be possible as well.

The terms "radio communications network", "network", "radio network", "cellular network", "radio network communications system", "cellular network communications system", "cellular radio communications technology", "cellular communications system" and "radio communications system" may refer to the same logical entity and may be used interchangeably throughout the entire description.

The word "circuit" is used herein to mean any kind of a logic implementing entity, which may be special purpose circuitry or processor executing software stored in a memory, firmware, or any combination thereof. Thus, in one or more examples, a "circuit" may be a hardwired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

FIG. 1 shows a communications system 100.

The communications system 100 may include a communications terminal 102 (which may also be referred to as a terminal 102), and at least one network component 106a, 106b, 106c, which may be part of a radio communications network 104. In other words, the at least one network component 106a, 106b, 106c may be a component of the radio communications network 104.

Only one terminal 102 is shown as an example, however the number of terminals may be greater than one, and may, for example, be two, three, four, five, six, seven, eight, nine, or on the order of tens, hundreds of, or even more terminals. In like manner, only three network components 106a, 106b, 106c are shown as an example, however the number of network components may be one, two and may be more, for example, four, five, six, seven, eight, nine, or on the order of tens, hundreds of, or even more network components.

The communications system 100 and/or the radio communications network 104 may be configured in accordance with the network architecture of any one of, or any combination of, LTE (Long Term Evolution) cellular communications technology, UMTS (Universal Mobile Telecommunications System) cellular communications technology, GSM (Global System for Mobile Communications) cellular communications technology, and CDMA2000 (Code Division Multiple Access) cellular communications technology, although other cellular communications technology may be possible as well.

The terminal 102 may include, or may be, a UE (user equipment) equipped with a SIM (Subscriber Identity Module) running on a UICC (Universal Integrated Circuit Card), a computer (e.g. a laptop equipped with, for example, a wireless radio connection, such as, for example, a 3G ($3^{rd}$ generation) radio connection), or any other equipment that may be configured to connect to a radio communications network.

The terminal 102 (e.g. a UE) may be within the area of coverage of the radio communications network 104, such as, for example, a PLMN (Public Land Mobile Network). The area of coverage of the radio communications network 104 may be the aggregate result of the coverage of the at least one network component 106a, 106b, 106c of the radio communications network 104. In other words, each network component of the at least one network component 106a, 106b, 106c of the radio communications network 104 may have a respective area of coverage, and an aggregation of the respective areas of coverage may determine the area of coverage of the radio communications network 104. By way of an example, the area of coverage (which may also be referred to as "the region of coverage") of the radio communications network 104 shown in FIG. 1 may at least be the aggregate result of the coverage of the network components 106a, 106b, and 106c, and other network components belonging to the radio communications network 104 (other network components (e.g. base stations) are not shown in FIG. 1).

At least one of the network components 106a, 106b, 106c may include, or may be, a base station, a NB (Node B), an eNB (Evolved Node B), a Home NB, a traditional NB, and a wireless router, although other network components may be possible as well.

In FIG. 1, the terminal 102 may be configured to transmit an uplink (UL) signal 110 at a particular power. An uplink (UL) may refer to a connection (e.g. a communications connection) from the terminal 102 towards at least one network component (e.g. the network component 106b) of the radio communications network 104. Accordingly, the UL signal 110 may include, or may be, a signal transmitted from the terminal 102 (e.g. a UE) to at least one network component (e.g. the network component 106b, for example a base station) of the radio communications network 104.

In FIG. 1, the at least one network component 106a, 106b, and 106c (e.g. base station) may be configured to transmit a downlink (DL) signal at a particular power. A downlink (DL) may refer to a connection (e.g. a communications connection) from at least one of the network components 106a, 106b, 106c of the radio communications network 104 towards the terminal 102. Accordingly, a DL signal may include, or may be, a signal transmitted from the at least one network component 106a, 106b, 106c (e.g. base station) to the terminal 102 (e.g. a UE). By way of an example, the network component 106a may be configured to transmit a DL signal 108a; the network component 106b may be configured to transmit a DL signal 108b; and the network component 106c may be configured to transmit a DL signal 108c. The respective DL signals 108a, 108b, 108c transmitted by the at least one network component 106a, 106b, and 106c may, for example, cover a particular geographical area.

The geographical area covered by a network component (i.e. the region of coverage of a network component) of the at least one network component 106a, 106b, or 106c may be substantially (namely, approximately) represented by a cell (which may also be referred to as a "radio cell"). By way of an example, the region of coverage of the network component 106a may be substantially represented by a cell 105a; the region of coverage of the network component 106b may be substantially represented by a cell 105b; and the region of coverage of the network component 106c may be substantially represented by a cell 105c. Accordingly, the region of coverage of the radio communications network 104 may be represented by at least one cell, or by a tessellation of two or more cells, where each cell may be an approximation of the area of coverage of a network component (e.g. base station) of the radio communications network 104. By way of an example, area of coverage of the radio communications network 104 may represented by the tessellation of cells 105a, 105b, and 105c.

Whilst a respective cell 105a, 105b, 105c may be an approximation of the area of coverage of a respective network component 106a, 106b, 106c, there may be geographical regions that may be served by more than one network component. By way of an example, the geographical region on either side of a boundary formed by a line joining points 1A and 1B shown in FIG. 1 may be served by the network component 106a or the network component 106b, or both; the geographical region on either side of a boundary formed by a line joining points 1B and 1C may be served by the network component 106a or the network component 106c, or both; and the geographical region on either side of a boundary formed by a line joining points 1B and 1D may be served by the network component 106b or the network component 106c, or both.

When the terminal 102 is initially switched off, there may be no connection between the terminal 102 and the radio communications network 104. For example, there may not exist a connection (e.g. a communications connection, e.g. a communications channel) between the terminal 102 and the network component 106b (or any of the other network components 106a, 106c) shown in FIG. 1 when the terminal 102 is powered down. Accordingly, a terminal 102 that is switched off may not have connectivity to a communications service and/or network resource (e.g. time slot, frequency bandwidth, channel access code, etc.) delivered by the radio communications network 104 and/or the network component 106b.

However, when the terminal 102 is turned on within and/or near the area of coverage of the radio communications network 104, the terminal 102 may search for and/or identify and/or select a network component of the at least one network component 106a, 106b, 106c of the radio communications network 104. By searching for and/or identifying and/or selecting a network component (e.g. a base station), the terminal 102 may establish a connection (e.g. communications connection) with the radio communications network 104 in order to, for example, use a communications service and/or network resource (e.g. time slot, frequency bandwidth, channel access code, etc.) delivered by the radio communications network 104 and/or at least one of the network components 106a, 106b, 106c.

A communications connection with the radio communications network 104 may be established by means of, for example, establishing at least one communications channel between the terminal 102 and at least one of the network components 106a, 106b, 106c. The at least one communications channel established between the terminal 102 and at least one of the network components 106a, 106b, 106c may include at least one UL channel (e.g. a channel from the terminal 102 to at least one of the network components 106a, 106b, 106c) and/or at least one DL channel (e.g. a channel from at least one of the network components 106a, 106b, 106c to the terminal 102).

The number of network components 106a, 106b, 106c used to establish a communications channels may, for example, depend on the radio communications network 104. In a radio communications network 104 which may, for example, be a hard handoff system, there may be a communications channel established between the terminal 102 and one of the network components (e.g. the network component 106b). If, for example, the terminal 102 is mobile (i.e. moving), the link to, for example, the network component 106b established through the communications channel may be terminated before, or as, the terminal 102 is transferred to a new network component (e.g. the network component 106a). In other words, the terminal 102 may be linked to no more than one network component at a given time.

In a radio communications network 104 which may, for example, be a soft handover (SHO) system (e.g. in a CDMA and/or UMTS system), the terminal 102 may be connected to two or more network components at a time (e.g. the network components 106a and 106b). The network component with, for example, the highest relative strength seen from the terminal 102 may be given control of the terminal 102.

A communications channel between the terminal 102 and at least one of the network components 106a, 106b, 106c may be assumed to be reciprocal. In other words, a quality of an UL channel between the terminal 102 and a network component (e.g. as measured by a criterion, e.g. dropped call rate, ratio of number of data received indicators (ACKs) to number of data not received indicators (NACK)) may be at least substantially equal to a quality of a DL channel between the network component and the terminal 102. For example, as shown in FIG. 1, the quality of an UL channel between the terminal 102 and the network component 106b may be substantially equal to the quality of a DL channel between the network component 106b and the terminal 102.

In a TDD (time-division duplexing) scheme where the UL channel and the DL channel use identical frequencies or frequency bands, the quality of the DL channel may be identical to the quality of the UL channel. In a FDD (frequency-division duplexing) scheme where the UL channel and the DL channel use different frequencies or frequency bands separated by a small frequency shift, the UL channel and the DL channel may be highly correlated. Accordingly, the quality of the DL channel may be approximately equal to the quality of the UL channel. There may, for example, be small differences caused by, e.g. slightly different fading characteristics on the DL channel as compared to the UL channel. However, the differences may not yield a significant difference in the quality of the UL channel and the quality of the DL channel. For example, delay spread of a path delay profile of the DL channel may not differ much from the UL channel. Accordingly, there may not be a substantial difference in the quality of the UL channel and the DL channel (e.g. as measured by a criterion, e.g. dropped call rate, ratio of number of data received indicators (ACKs) to number of data not received indicators (NACK)).

Figure 2:
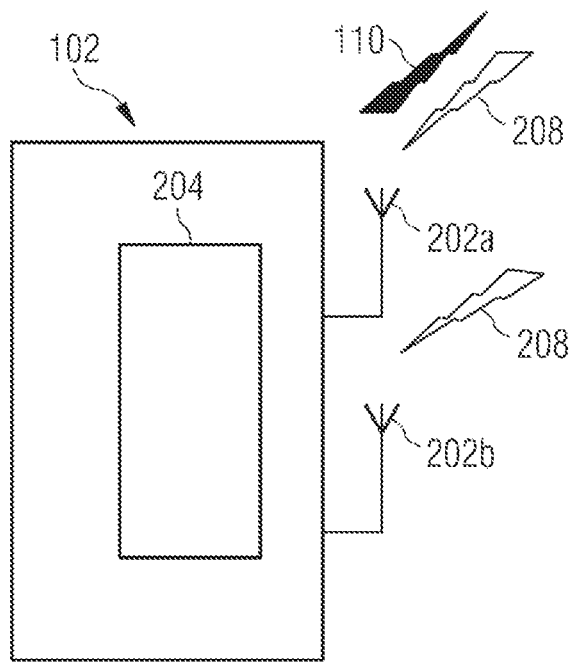
FIG. 2 shows a block diagram of a terminal.

FIG. 2 shows a block diagram of the terminal 102.

Reference signs in FIG. 2 that are the same as in FIG. 1 denote the same or similar elements as in FIG. 1. Thus, those elements will not be described in detail again here; reference is made to the description above. Differences between FIG. 2 and FIG. 1 are described below.

The terminal 102 may include a plurality of antennas 202a, 202b and a receiver 204. Only two antennas 202a, 202b are shown as an example of the plurality of antennas, however the number of antennas may be greater than two, and may, for example, be three, four, five, six, seven, eight, nine, or on the order of tens, or even more antennas.

During operation of the terminal 102, signals may not be transmitted and/or received on plurality of antennas 202a, 202b with, for example, identical data throughputs and/or powers. In other words, the plurality of antennas 202a, 202b may exhibit differences (e.g. in data throughputs and/or transmit and/or receive powers). For example, the differences among the antennas of the plurality of antennas 202a, 202b may be a result of, for example, an object (e.g. a hand and/or a head of a human user) covering at least one antenna of the plurality of antennas 202a, 202b. For example, a hand of a user of the terminal 102 may cover the antenna 202b, whilst the antenna 202a may not be covered by the hand and/or head of the user, or blocked in any way, thus resulting in a difference in, for example, data throughputs and/or transmit and/or receive powers among the antennas of the plurality of antennas 202a, 202b. By way of another example, the differences among the antennas of the plurality of antennas 202a, 202b may be a result of, for example, antennas of the plurality of antennas 202a, 202b having different polarizations and/or alignments. Accordingly, the polarizations and/or alignments of some antennas of the plurality of antennas 202a, 202b may be better than others, thus resulting in a difference in, for example, data throughputs and/or transmit and/or receive powers among the antennas of the plurality of antennas 202a, 202b.

In a DL transmission where a DL signal 208 (e.g. which may include at least one of DL signals 108a, 108b, 108c shown in FIG. 1) is transmitted from at least one of the network components 106a, 106b, 106c, the terminal 102 may, for example, concurrently use at least two antennas of the plurality of antennas 202a, 202b to receive a DL signal. In other words, the terminal 102 may exhibit parallel reception of the DL signal 208 with multiple antennas 202a, 202b in the DL. Stated in yet another way, the terminal 102 may receive the DL signal 208 using two or more of its antennas at the same time. In the example shown in FIG. 2, the terminal 102 receives the DL signal 208 using the antennas 202a and 202b at the same time. In other words, the terminal 102 may use receive diversity.

In a DL transmission from the radio communications network 104 (e.g. from at least one of the network components 106a, 106b, 106c), the above-described differences among the antennas of the plurality of antennas 202a, 202b may be considered. For example, the terminal 102 may include the receiver 204, which may, for example, select and/or combine the DL signal 208 received on each antenna of the plurality of antennas 202a, 202b. For example, the receiver 204 may include, or may be, one or more rake receivers. Accordingly, the receiver 204 may, for example, be configured to perform at least one of selection combining, equal combining, switched combining or maximal ratio combining, although other combination schemes may be possible as well. By way of another example, the receiver 204 may select the DL signal 208 received on at least one "better" antenna among the plurality of antennas 202a, 202b, for example, when DL channel conditions are good. The at least one "better" antenna may be regarded as "better" based on some criterion, e.g. SNR (signal-to-noise ratio). Other antennas of the plurality of antennas 202a, 202b which do not meet the criterion may, for example, be turned off during reception of the DL signal 208. Hence, the DL signal 208 may not be received by antennas which do not meet the criterion.

On the other hand, an UL transmission from the terminal 102 to the radio communications network 104 (e.g. to at least one of the network components 106a, 106b, 106c) may only use one antenna of the plurality of antennas 202a, 202b at a given time. For example, the terminal 102 shown in FIG. 2 may transmit the UL signal 110 using only the antenna 202a, whilst antenna 202b may be turned off (e.g. not used) during an UL transmission of the UL signal 110. The antenna 202a used for an UL transmission may, for example, be referred to as the main antenna.

In contrast to reception of a DL signal 208 where a selection of at least one antenna of the plurality of antennas 202a, 202b may be performed by, for example, the receiver 204 (e.g. by means of combining and/or selection of an antenna), the terminal 102 may not be configured to perform a selection of antennas in an UL transmission. For example, the terminal 102 may not be configured to select an antenna of the plurality of antennas 202a, 202b to transmit the UL signal 110. For example, the antenna 202a shown in FIG. 2 may, for example, be arbitrarily fixed as the main antenna by the manufacturer. Therefore, the terminal 102 may not, for example, actually perform a selection of the antenna 202a to transmit the UL signal 110. For example, the terminal 102 may be configured (e.g. preprogrammed and/or hardwired) to use only antenna 202a as a transmit antenna in an UL transmission. Furthermore, selection of at least one antenna of the plurality of antennas 202a, 202b by the terminal 102 to transmit the UL signal 110 may be difficult. For example, the terminal 102 may not have explicit knowledge of a quality of reception (e.g. SNR) at an antenna of the at least one network component 106a, 106b, 106c (e.g. NB). Accordingly, the terminal 102 may not have a metric which may be used to select an antenna of the plurality of antennas 202a, 202b for an UL transmission. In addition, the terminal 102 may be configured to transmit the UL signal 110 with only one antenna, and not with two or more antennas in parallel, namely, at the same time. In other words, the terminal 102 may not be configured to perform a parallel transmit procedure in a UL transmission where the UL signal 110 is transmitted concurrently on two or more antennas of the plurality of antennas 202a, 202b. This may be in contrast to the parallel reception with the plurality of antennas 202a, 202b in the DL, where the DL signal 208 may be received concurrently on two or more antennas of the plurality of antennas 202a, 202b.

In summary, the terminal 102 may not be configured or able to select an antenna of the plurality of antennas 202a, 202b to transmit the UL signal 110. In addition, or separately, the terminal 102 may not be configured to concurrently use more than one antenna of the plurality of antennas 202a, 202b in an UL transmission.

Accordingly, use of an antenna (e.g. antenna 202a) with, for example, a poor data throughput and/or poor polarization and/or alignment in an UL transmission may result in poor reception (or non-reception) of the UL signal 110 by the radio communications network 104. This may reduce an uplink throughput in the terminal 102 and/or the radio communications network 104. The radio communications network 104 (e.g. a UMTS system) may require the terminal 102 to retransmit the UL signal 110 in case the UL signal 110 is not received by it (e.g. by at least one of the network components 106a, 106b, 106c). For example, the radio communications network 104 may require the terminal 102 to retransmit the UL signal 110 at a higher transmit power and/or to retransmit the UL signal 110 until the radio communications network 104 received the UL signal 110. Consequently, retransmission of the UL signal 110 by the terminal 102, e.g. due to use of an antenna with a poor performance, may increase a power consumption of the terminal 102, and may consequently reduce a stand-by time of the terminal 102. In addition, retransmissions may waste valuable network resources (e.g. time slot, frequency bandwidth, channel access code, etc.) of the radio communications network 104, which may otherwise have been allocated for other uses.

Accordingly, there may be a need to enable or allow the terminal 102 to select an antenna of the plurality of antennas 202a, 202b to transmit a signal (e.g. the UL signal 110). Separately, or in addition, there may be a need to enable the terminal 102 to use more than one antenna of the plurality of antennas 202a, 202b in a transmission (e.g. in an UL transmission).

Enabling a terminal to select and/or use at least one antenna to transmit a signal may have an effect of increasing a stand-by time of the terminal.

Enabling a terminal to select and/or use at least one antenna to transmit a signal may have an effect of reducing power consumption in the terminal.

Enabling a terminal to select and/or use at least one antenna to transmit a signal may have an effect of increasing uplink throughput in the terminal and/or a radio communications network.

Enabling a terminal to select and/or use at least one antenna to transmit a signal may have an effect of optimizing the use of network resources (e.g. time slot, frequency bandwidth, channel access code, etc.) of a radio communications network and/or of a radio cell.

Figure 3:
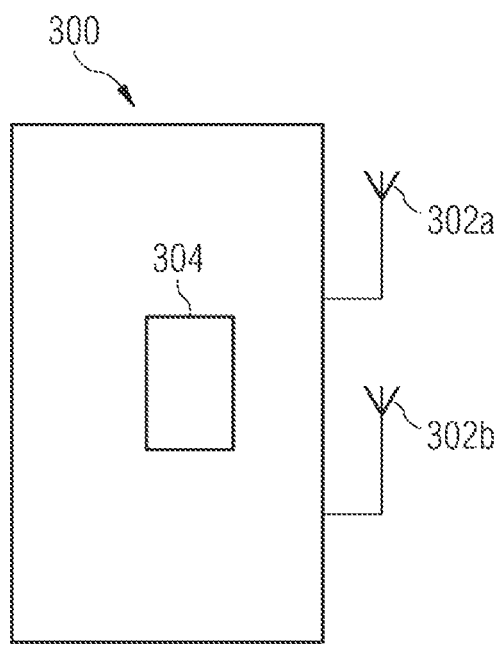
FIG. 3 shows a block diagram of a communications terminal including a plurality of antennas and a selection circuit.

FIG. 3 shows a block diagram of a communications terminal 300 including a plurality of antennas 302a, 302b and a selection circuit 304.

The communications terminal 300 may, for example, be able to select at least one antenna to transmit a signal. For example, the communications terminal 300 may select antenna 302a and/or antenna 302b to transmit a signal (e.g. to a radio communications network).

Only two antennas 302a, 302b are shown as an example of the plurality of antennas, however the number of antennas may be greater than two, and may, for example, be three, four, five, six, seven, eight, nine, or on the order of tens, or even more antennas.

The communications terminal 300 may include, or may be, a UE (user equipment) equipped with a SIM (Subscriber Identity Module) running on a UICC (Universal Integrated Circuit Card), a computer (e.g. a laptop equipped with, for example, a wireless radio connection, such as, for example, CDMA2000 and/or UMTS), or any other equipment that may be configured to connect to a radio communications network.

The selection circuit 304 may, for example, be configured to select at least one antenna of the plurality of antennas 302a, 302b as a transmit antenna for a transmission to a radio communications network. The selection of the transmit antenna by the selection circuit 304 may, for example, be based on a selection criterion (see description below in respect of FIG. 4).

For example, antenna 302a and/or antenna 302b may be selected as the transmit antenna or transmit antennas for a transmission of, for example, an UL signal, to a radio communications network (e.g. to at least one network component (e.g. eNB, base station, etc.) of the radio communications system). By way of another example, the antenna 302a of the communications terminal 300 may, for example, be a transmit antenna for a current (e.g. present) transmission to a radio communications network. In such an example, the selection circuit 304 may, for example, switch the transmit antenna from antenna 302a to antenna 302b. In other words, the selection circuit 304 may be configured to select at least one antenna of the plurality of antennas 302a, 302b as a transmit antenna for a subsequent transmission (e.g. UL transmission) to a radio communications network.

As described above, there may be differences among the plurality of antennas 302a, 302b (e.g. differences in data throughputs and/or transmit power). The selection circuit 304 may use these differences among the plurality of antennas 302a, 302b to select a transmit antenna that may, for example, result in a more efficient and/or a more reliable transmission from the communications terminal 300 to a radio communications network.

An effect provided by the communications terminal 300 may be increase in stand-by time of the communications terminal 300.

An effect provided by the communications terminal 300 may be reduction in power consumption in the communications terminal 300.

An effect provided by the communications terminal 300 may be increased uplink throughput in the communications terminal 300 and/or in a radio communications network to which the communications terminal 300 transmits a signal.

An effect provided by the communications terminal 300 may be optimized use of network resources (e.g. time slot, frequency bandwidth, channel access code, etc.) of a radio communications network to which the communications terminal 300 transmits a signal.

An effect provided by the communications terminal 300 may be substantial reduction or removal of a need for feedback or control from a network component to select a transmit antenna, thus allowing selection of a transmit antenna in the communications terminal 300 to be standard independent.

Figure 4:
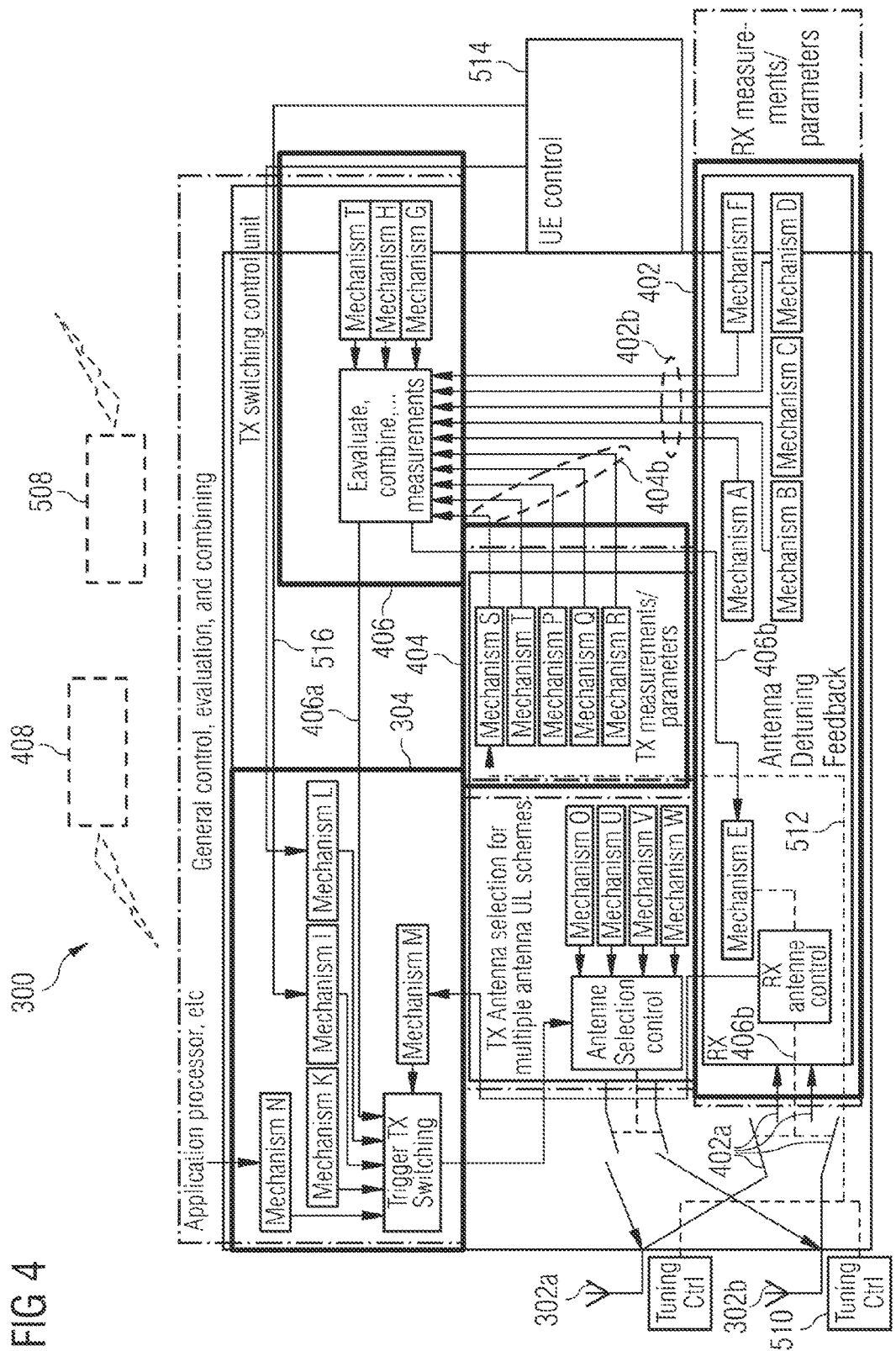
FIG. 4 shows a detailed block diagram of a communications terminal including a plurality of antennas, a selection circuit, a receiver, a transmitter, and a determining circuit.

FIG. 4 shows a detailed block diagram of the communications terminal 300 including the plurality of antennas 302a, 302b, the selection circuit 304, a receiver 402, a transmitter 404, and a determining circuit 406.

Reference signs in FIG. 3 that are the same as in FIG. 2 denote the same or similar elements as in FIG. 2. Thus, those elements will not be described in detail again here; reference is made to the description above. Differences between FIG. 3 and FIG. 2 are described below.

As described above, the selection of the transmit antenna by the selection circuit 304 may be based on a selection criterion. The selection criterion may be based on signals and/or information and/or messages provided to a determining circuit 406. The determining circuit 406 may determine whether the selection criterion is fulfilled and may be configured to provide a selection trigger to the selection circuit 304 in case the selection criterion is fulfilled. The selection trigger may trigger the selection of the transmit antenna by the selection circuit 304. Provision of the selection trigger by the determining circuit 406 to the selection circuit 304 is indicated as arrow 406a in FIG. 4. The description that follows describes the selection criterion, how the determining circuit 406 determines whether the selection criterion is fulfilled, and how the selection circuit 304 may select at least one transmit antenna.

The selection criterion may be based on a receive signal 408 received from a radio communications network (e.g. a CDMA2000 network, LTE network, etc.) on the plurality of antennas 302a, 302b. For example, the selection criterion may be based on a parameter and/or a characteristic of the receive signal 408. The receive signal 408 may, for example, be received from a network component (e.g. eNB) of the radio communications network on the plurality of antennas 302a, 302b. For example, the receive signal 408 may include, or may be, a downlink (DL) signal from the radio communications network (e.g. a CDMA2000 network, LTE network, etc.).

The communications terminal 300 may include a receiver 402 configured to receive the receive signal 408 from the plurality of antennas 302a, 302b. For example, the receiver 402 may be connected (e.g. electrically and/or communicatively connected) to the plurality of antennas 302a, 302b. The connection between the receiver 402 and the plurality of antennas 302a, 302b is indicated as connection 402a in FIG. 4. The receiver 402 may be configured to provide the receive signal 408 received from the plurality of antennas 302a, 302b to, for example, the determining circuit 406. The provision of the receive signal 408 by the receiver 402 to the determining circuit 406 may be indicated by the group of arrows 402b shown in FIG. 4.

As described above, the selection criterion may be based on a parameter of the receive signal 408. Use of the parameter of the receive signal 408 (e.g. a DL signal) in selecting the transmit antenna may be possible due to reciprocity of an UL channel and a DL channel (described above in relation to FIG. 1). For example, a parameter of the receive signal 408 may indicate the quality of a DL channel from the radio communications network to the plurality of antennas 302a, 302b. The quality of an UL channel in an opposite direction (e.g. from the plurality of antennas 302a, 302b to the radio communications network) may, for example, be inferred from this parameter.

The plurality of antennas 302a, 302b may exhibit parallel reception of the receive signal 408 (e.g. DL signal). In other words, the receive signal 408 (e.g. DL signal) may be received by each antenna of the plurality of antennas 302a, 302b, for example, at the same time. Stated in yet another way, the receive signal 408 may be received concurrently by each antenna of the plurality of antennas 302a, 302b. Accordingly, a parameter of the receive signal 408 (e.g. DL signal) may be determined (e.g. by the determining circuit 406) for each antenna of the plurality of antennas 302a, 302b, and the parameter associated with each antenna of the plurality of antennas 302a, 302b may be used (e.g. by the selection circuit 304) to infer the quality of an UL channel from a respective antenna of the plurality of antennas 302a, 302b to the radio communications network (e.g. a network component of the radio communications network).

The parameter of the receive signal 408 may include, or may be, a power of the receive signal 408 (e.g. DL signal). In this regard, several measures of the power of the receive signal 408 may be available.

The power of the receive signal 408 may include, or may be, a total power of the receive signal 408 (e.g. DL signal). For example, the receive signal 408 (e.g. DL signal) may include an information bearing signal (e.g. a reference signal), thermal noise, interference (e.g. co-channel and/or inter-channel interference) and possibly other sources. Therefore, the power of each of these components of the receive signal 304 (e.g. DL signal) may contribute to the total power of the receive signal 408 (e.g. DL signal). The selection criterion may be based on the total power of the receive signal. For example, the total power of the receive signal 408 received at the plurality of antennas 302a, 302b (e.g. at each antenna of the plurality of antennas 302a, 302b) may give an indication of the quality of an UL channel between each antenna of the plurality of antennas 302a, 302b and the network component from which the receive signal 408 is received. For example, a high RSSI (Receive Signal Strength Indicator) of a receive signal 408 (e.g. DL signal) received in, for example, an IEEE 802.11 radio communications system, may indicate a high quality UL channel. Accordingly, the selection circuit 304 may select an antenna of the plurality of antennas 302a, 302b with a high (e.g. the highest) RSSI as the transmit antenna. Conversely, if an antenna of the plurality of antennas 302a, 302b is covered by a hand of a user of the communications terminal 300, that antenna may have a lower RSSI in the DL channel, and this may, for example, indicate poor channel conditions in the UL channel. Determination of the total power of the receive signal 408 by the determining circuit 406 is indicated as "Mechanism A" in FIG. 4.

As described above, the total power of the receive signal 408 may include contributions from an information bearing signal (e.g. reference signal), thermal noise, interference (e.g. co-channel and/or inter-channel interference) and possibly other sources. Therefore, an antenna receiving a high noise power and a low information bearing signal (e.g. reference signal) power may have the same total power of the receive signal 408 as another antenna receiving a low noise power and a high information bearing signal (e.g. reference signal) power. This may, for example, be possible when the beam pattern of the respective antennas point in different directions. Accordingly, basing the selection criterion on the total power of the receive signal 408 received on the plurality of antennas 302a, 302b (e.g. on each antenna of the plurality of antennas 302a, 302b) may not give an accurate indication of the quality of an UL channel. Therefore, another measure of the power of the receive signal 408 may be necessary.

Accordingly, the power of the receive signal 408 may include, or may be, a power of a reference signal (or a signal not considered as interference and/or noise) included in the receive signal 408. In other words, the parameter of the receive signal 408 determined by the determining circuit 406 may include, or may be, a power of a reference signal (or a signal not considered as interference and/or noise) included in the receive signal 408. The selection criterion may therefore be based on the power of the reference signal included in the receive signal 408. For example, a RSCP (Receive signal Code Power) of the receive signal 408 may be a measure of the power of a reference signal included in the receive signal 408 (e.g. DL signal, e.g. DL signal in a UMTS communications system). By way of another example, a RSRP (Reference Signal Received Power) of the receive signal 408 may be a measure of the power of a reference signal included in the receive signal 408 (e.g. DL signal, e.g. DL signal in a LTE communications system). Accordingly, the selection circuit 304 may select an antenna of the plurality of antennas 302a, 302b with a high (e.g. the highest) RSRP and/or RSCP as the transmit antenna. Conversely, if an antenna of the plurality of antennas 302a, 302b is covered by a hand of a user of the communications terminal 300, that antenna may have a lower RSRP and/or RSCP in the DL channel, and this may indicate poor channel conditions in the UL channel.

Determination of the power of the reference signal (or a signal not considered as interference and/or noise) included in the receive signal 408 (e.g. by the determining circuit 406) may be contingent on the reference signal or measurements of the reference signal (e.g. power measurements of the reference signal) being available and/or provided to the communications terminal 300. In this regard, RATs (radio access technologies), such as, for example, LTE, CDMA200, etc., may be configured to provide measurements of a reference signal (e.g. power measurements of a reference signal) as part of handover decisions between cells of a RAT (e.g. when the communications terminal 300 moves from one cell to another). Accordingly, such measurements of the power of the reference signal may be available in current RATs, and this may be used to determine the power of the reference signal. Determination of the power of the reference signal included in the receive signal 408 by the determining circuit 406 is indicated as "Mechanism B" in FIG. 4.

As described above, the receive signal 408 may include an information bearing signal (e.g. reference signal), thermal noise, interference (e.g. co-channel and/or inter-channel interference) and possibly other sources. In other words, the receive signal 408 may include a reference signal and noise (which may include thermal noise, interference and possibly other sources other than the reference signal).

Accordingly, the power of the receive signal 408 may include, or may be, a ratio of a power of the reference signal to a power of the noise. This ratio may also be referred to as a signal-to-noise ratio (SNR) or signal-to-interference and noise ratio (SINR) of the receive signal 408. In other words, the parameter of the receive signal 408 determined by the determining circuit 406 may include, or may be, a SNR or SINR of the receive signal 408. The selection criterion may be based on the SNR or SINR of the receive signal 408. For example, the receive signal 408 may be received on the plurality of antennas 302a, 302b over a common channel (e.g. a pilot channel) or a dedicated channel for a user of the communications terminal 300. For example, a PDSCH (Physical Downlink Shared Channel) may be used in an LTE communications system, in which case the SNR or SINR may include, or may be, a RSRQ (Reference Signal Received Quality). By way of another example, a DPCH (Dedicated Physical Channel) may be used in a 3G communications system, in which case the SNR or SINR may include, or may be, the Ec/Io of the DPCH. Determination of the SNR or SINR of the receive signal 408 by the determining circuit 406 is indicated as "Mechanism C" in FIG. 4.

In summary, the selection criterion may be based on a parameter of the receive signal 408. The parameter of the receive signal 408 may be determined by the determining circuit 406. The parameter of the receive signal 408 may include, or may be, a power of the receive signal 408. The power of the receive signal 408 may, for example, include, or may be, at least one of: a total power of the receive signal 408, a power of a reference signal included in the receive signal 408 and a SNR or SINR of the receive signal 408.

As described above in relation to FIG. 1, in a soft handover system (e.g. in a 3G communications system) there may potentially be more than one cell serving the communications terminal 300. In other words, the communications terminal may receive a plurality of receive signals 408, each receive signal of the plurality of receive signals 408 being received from a respective network component of a radio communications system. In such an example, the determining circuit 406 may determine a parameter for each receive signal of the plurality of receive signals 408. Thereafter, the determining circuit 406 may select and/or combine the parameters determined for the plurality of receive signals 408.

For example, the determining circuit 406 may combine the parameters by summing the parameters determined for the plurality of receive signals 408. By way of another example, the determining circuit 406 may combine the parameters by taking a weighted sum of the parameters determined for the plurality of receive signals 408. By way of yet another example, the determining circuit 406 may select the a parameter (e.g. best parameter, for example, a highest value) of the plurality of parameters determined for the plurality of receive signals 408.

The way the parameters of the plurality of receive signals 408 are selected and/or combined may depend on a reliability factor of the network components from which the plurality of receive signals 408 is received. For example, the reliability factor of the network components may include, or may be, an uplink reliability factor.

For example, the uplink reliability factor of the network components may be indicated by the number of ACKs/NACKs received by the communications terminal 300 for an uplink packet sent to the network components. For example, the parameter of the receive signal 408 received from the network component which may send the most number of ACKs to the communications terminal 300 may be selected by the determining circuit 408.

By way of another example, the uplink reliability factor of the network components may include, or may be, an uplink power control command received from the network components. For example, a network component which sends the most power down commands, may have the best reception in the uplink from the communications terminal 300 to the network component. Accordingly, the parameter of the receive signal 408 received from this network component could be selected. By way of another example, the network components with the most power up requests may be taken into account in a weighting of the parameters of the receive signal 408 received from the network components.

By way of yet another example, the uplink reliability factor of the network components may include, or may be, an uplink grant. For example, a 3G E-DCH (enhanced dedicated channel) transmission may rely on uplink grants from more than just the serving cell. Neighboring cells may downgrade the grant in order to control uplink interference. This information may be used to control the antenna selection.

To further increase data throughput, new standards may specify carrier aggregation. In other words, the receive signal 408 may be received on the plurality of antennas 302a, 302b over a plurality of frequencies and/or frequency bands. The plurality of frequencies and/or frequency bands may include a main carrier and one or more sub-carriers. For example, in a 3G communications system, a carrier aggregation may be specified for a downlink connection, e.g. DC-HSDPA (Dual Channel High-Speed Downlink Packet Access), and/or for an uplink connection, e.g. DC-HSUPA (Dual Channel High-Speed Uplink Packet Access). Thus, the above-described parameters (e.g. total power, power of reference signal, SNR, SINR) may be determined by the determining circuit 406 for multiple frequencies or bands (e.g. for each frequency of the plurality of frequencies). In other words, the parameter of the receive signal 408 may include a plurality of frequency-specific parameters. Each frequency-specific parameter may be, for example, the parameter of the receive signal 408 received on a respective frequency or frequency band of the plurality of frequencies. For example, a frequency-specific parameter may include, or may be, a total power of the receive signal 408 at a particular frequency (or frequency band) and/or a power of a reference signal at a particular frequency (or frequency band) and/or an SNR of the receive signal 408 at a particular frequency (or frequency band) and/or an SINR of the receive signal 408 at a particular frequency (or frequency band). The selection criterion may be based on at least one frequency-specific parameter determined by the determining circuit 406. For example, the selection criterion may be based on a selection of at least one frequency-specific parameter and/or a combination of two or more frequency-specific parameters. For example, a selection and/or combination criteria may be for the main carrier to take priority because it may contain the most amount of information of the receive signal 408. By way of another example, a selection and/or combination criteria may be to select the frequency-specific parameter of the receive signal 408 that is received on the carrier that provides the highest throughput in an uplink and/or downlink. By way of yet another example, a selection and/or combination criteria may be to weight the frequency-specific parameters based their throughput contribution. In other words, the selection criterion may be based on at least one frequency-specific parameter of the plurality of frequency specific parameters. Determination of a parameter of the receive signal 408 for a plurality of frequencies by the determining circuit 406 is indicated as "Mechanism D" in FIG. 4.

As described above, the receive signal 408 (e.g. DL signal) may be received by each antenna of the plurality of antennas 302a, 302b, for example, at the same time. In other words, all antennas of the plurality of antennas 302a, 302b may be required to be turned on (e.g. actively receiving) during reception of the receive signal 408 (e.g. DL signal). However, this may not always be possible in the communications terminal 300. For example, with dynamic receive diversity, at least one antenna may be switched off and at least one antenna may be switched on during reception of the receive signal 408. This may be done for the receiver 402 to save power. Accordingly, in order to determine the above-described parameters, all antennas of the plurality of antennas 302a, 302b may need to be switched on in order to receive the receive signal 408 at the same time. The plurality of antennas 302a, 302b may be switched on for a very short time, and thus may not significantly impact the power consumption of the communications terminal 300.

There may, for example, be a receive trigger that may cause all antennas of the plurality of antennas 302a, 302b to be switched on for a short time in order to receive the receive signal 408 at the same time (e.g. concurrently or simultaneously). This receive trigger may, for example, be for instructing each antenna of the plurality of antennas 302a, 302b to receive the receive signal 408 from the radio communications network at the same time. The determining circuit 406 may be configured to provide the receive trigger to the plurality of antennas 302a, 302b. The provision of the receive trigger to the plurality of antennas 302a, 302b is indicated as arrow 406b in FIG. 4. As shown in FIG. 4, the receive trigger may, for example, trigger the connection 402a with the plurality of antennas 302a, 302b, thus enabling the plurality of antennas 302a, 302b to receive the receive signal 408 from the radio communications network at the same time (i.e. concurrently or simultaneously).

The receive trigger may be provided by the determining circuit 406 to the plurality of antennas 302a, 302b regularly or on upon an event. For example, the determining circuit 406 may store (e.g. in memory) the parameter of the receive signal 408 previously determined by it. By way of another example, the determining circuit 406 may store (e.g. in memory) a plurality of previously determined parameters of the receive signal 408. By way of yet another example, the determining circuit 406 may store (e.g. in memory) an average of the previously determined parameters of the receive signal 408. The determining circuit 406 may, for example, determine how recent the parameters of the receive signal 408 stored (e.g. in a memory) are. If the parameters (e.g. an average of a prescribed number of a previously determined parameters) are recent, the determining circuit 406 may not provide the receive trigger to the plurality of antennas 302a, 302b. However, if the parameters are determined to be old (e.g. because dynamic receiver diversity has deactivated one antenna for a long time), e.g., more than 3 seconds, then the determining circuit 406 may provide the receive trigger to the plurality of antennas 302a, 302b, for example, to obtain an up-to-date measurement of the receive signal 408. This may enable the determining circuit 406 to determine an up-to-date parameter of the receive signal 408. In summary, the determining circuit 408 may store (e.g. in memory) previously determined parameters of the receive signal 408, and may be further configured to determine whether the previously determined parameters of the receive signal are outdated. The determining circuit 408 may provide the receive trigger to the plurality of antennas 302a, 302b if it determines that the previously determined parameters of the receive signal are outdated. Use of this procedure by the determining circuit 406 is indicated as "Mechanism E" in FIG. 4.

As described above, the receive signal 408 may be received on the plurality of antennas 302a, 302b from a plurality of network components (i.e. a plurality of cells). When the selection circuit 304 selects a transmit antenna based on parameters of the receive signal 408 that may be cell specific, different strategies may be possible regarding which cell to use. For example, the communications terminal 300 may request a handover to another cell (i.e. a target cell) because that other cell would be better. In other words, the target cell may be a radio cell specified in a handover request sent by the communications terminal 300 to the radio communications network. In such an example, the determining circuit 406 may determine the parameter of the receive signal 408 received from the target cell and the determining circuit 406 may determine in advance the best transmit antenna for the target cell. If this is a different one than on the current cell, the switching to the selected transmit antenna (e.g. by the selection circuit 304) could, for example, take place at the point of handover. In other words, the selection criterion may be based on a parameter of the receive signal 408 received from a cell specified in a handover request sent by the communications terminal 300 to the radio communications network. In a soft handover system (e.g. in a 3G communications system), where there may be an active set with multiple serving cells, the selection circuit 304 may add a requested new cell to its decision matrix for the soft handover cells (e.g. see above description) to come to the optimal condition when the new cell would be added to the active set. In the same way one could exclude a cell of the active set, which the communications terminal 300 may ask the radio communications network to remove from the decision matrix. Use of this procedure by the determining circuit 406 is indicated as "Mechanism F" in FIG. 4.

In summary, the preceding examples show that the selection criterion may be based on, for example, a parameter of the receive signal 408 received from the radio communications network (e.g. a CDMA2000 network, LTE network, etc.) on the plurality of antennas 302a, 302b. The description that follows provides examples which show that the selection criterion may be based on control information that may, for example, be received from the radio communications network on the plurality of antennas. The control information may, for example, control a transmission of a transmit signal 508 on the plurality of antennas 302a, 302b.

The communications terminal 300 may include a transmitter 404 configured to transmit the transmit signal 508 on at least one antenna of the plurality of antennas 302a, 302b. The transmitter 404 may, for example, control the transmission of the transmit signal 508 based on control information. The control information may be provided to the communications terminal 300 by the radio communications network. For example, the control information may be known to the transmitter 404 based on a communication between the communications terminal 300 and a network component of the radio communications network (e.g. with a BS protocol stack). By way of another example, the control information may be stored in a protocol stack of the communications terminal 300 (e.g. a UE).

The transmitter 404 may be configured to provide the control information to the determining circuit 406. In other words, the determining circuit 406 may be configured to receive the control information from the transmitter 404. The provision of the control information by the transmitter 404 to the determining circuit 406 may be indicated by the group of arrows 404b shown in FIG. 4.

The control information may include, or may be, power control information. The power control information may, for example, be provided to the communications terminal 300 by a network component (e.g. a base station) of the radio communications network. For example, the network component may request the communications terminal 300 via the power control information to transmit the transmit signal 508 at a particular power. In other words, the power control information may be suitable for controlling a transmission power of the transmit signal 508 on the plurality of antennas.

Stated in yet another way, the power control information may control the power of the transmitter 404 when transmitting the transmit signal 508.

As described above, the determining circuit 406 may be configured to determine whether the selection criterion is fulfilled. The determining circuit 406 may use the transmission power to verify whether this determination was correct. In other words, the transmission power may be used to verify whether the selected transmit antenna was a correct choice. For example, the determining circuit 406 may compare the transmission power on the transmit antenna to the transmission power on a previous transmit antenna (e.g. previously selected transmit antenna), which may be stored in a memory of the determining circuit 406. In other words, the determining circuit 406 may be configured to compare the transmission power of the transmit signal 508 prior to selection of the transmit antenna (e.g. by the selection circuit 304) and the transmission power of the transmit signal 508 after selecting the transmit antenna (e.g. by the selection circuit 304). This procedure could be used to verify if selection of the transmit antenna was correct. If the determining circuit 406 determines that selecting the transmit antenna was not the correct decision (e.g. if the transmission power after selecting the transmit antenna is larger than the transmission power prior to selecting the transmit antenna), the determining circuit 406 may provide a selection trigger to selection circuit 304, which may cause the selection circuit 304 to select another antenna. In other words, the selection criterion may be based on a comparison of the transmission power of the transmit signal 508 prior to selecting the transmit antenna and the transmission power of the transmit signal 508 after selecting the transmit antenna.

When determining the transmission power, the determining circuit 406 could, for example, average over a certain period of time. A comparison of a previous and a present transmission power by the determining circuit 406 may show that there may be substantially no difference in the previous and present transmission powers. This may mean that there may be no significant change in the radio conditions. To cross-check if the negligible difference between the previous and present transmission powers is indeed due to no significant change in the radio conditions, the determining circuit 406 could check if other values like RSSI, RSRP, RSCP, etc. have changed significantly or not. In other words, the selection circuit 304 may be further configured to reselect at least one other antenna of the plurality of antennas 304a, 304b as a new transmit antenna in case the transmission power of the transmit signal 508 after selecting the transmit antenna is greater than the transmission power of the transmit signal prior to selecting the transmit antenna. Determination of a previous and a present transmission power by the determining circuit 406 is indicated as "Mechanism I" in FIG. 4.

The control information may include, or may be, radio link control (RLC) information. In other words, the control information may include, or may be, control information in the radio link control (RLC) communication layer. The RLC information may, for example, be known to the communications terminal 300 (e.g. stored in a protocol stack of the communications terminal 300).

The selection criterion may be based on the RLC information. For example, the number of pending ACKs (data received acknowledgements) may be considered as a measure of transmit quality on an RLC level in, for example, an RLC Acknowledged mode. Accordingly, the number of pending ACKs may be considered a measure of the likelihood that the transmit signal 508 is received by the radio communications system. For example, the communications terminal 300 may send the transmit signal 508 on a DCCH (Dedicated Control Channel), e.g. a UL DCCH. The transmit signal 508 may, for example, be an event based measurement report such as a 3G event 2f, which may be used to deactivate a CM (configuration manager) of the radio communications network (e.g. event 1b). The transmit signal 508 (e.g. sent on UL DCCH) may not be received by the radio communications network or the radio communications network may not be able to demodulate the transmit signal 508. Accordingly, the number of pending ACKs on the side of the communications terminal 300 may increase (e.g. incremented). Accordingly, a high number of pending ACKs may indicate to the selection circuit 304 that the currently used transmit antenna may not be successfully transmitting the transmit signal 508. At the same time the number of "Request for Retransmissions" from the radio communications network side may increase, despite attempts by the communications terminal 300 to retransmit the transmit signal 508. This may proceed until, for example, the RLC of the communications terminal 300 hits a "max retransmission counter" indicating that the maximum number of retransmission attempts has been reached by the communications terminal 300. This may trigger an RLC reset in the communications terminal 300, which may result in a RLF (Radio link failure). This scenario would indicate to the determining circuit 406 on an RLC level that the currently used transmit antenna may not successfully transmitting the transmit signal 508 to the network. Accordingly, the determining circuit 406 may consequently provide the selection trigger to the selection circuit 304, which may select a new transmit antenna. Provision of control information in the RLC communication layer to the determining circuit 406 is indicated as "Mechanism P" in FIG. 4.

The control information may include, or may be, control information in a radio resource control (RRC) communication layer. The control information in the RRC communication layer may, for example, indicate a change in an uplink channel condition, which may require selection of a new transmit antenna. For example, control information in the RRC communications layer may include, or may be, CQI (Channel Quality Information) reporting configuration settings. For example, CQI may be sent to the radio communications network, e.g. by the communications terminal 300. In other words, CQI may be reported to the radio communications network (e.g. by the communications terminal 300). The radio communications network may, for example, control the frequency with which the CQI is reported (e.g. by the communications terminal 300) by means of CQI reporting configuration settings, which may be sent as part of, or as, control information in the RRC communications layer. The frequency with which the CQI has to be reported to the radio communications network (e.g. by the communications terminal 300) may, for example, indicate a change in an uplink channel condition, which may require selection of a new transmit antenna.

For example, during HSDPA (High Speed DL Packet Access) operation (e.g. in the case of PS-only (packet switched) or MRAB (multiple radio access bearers)), CQI is transmitted on the HS-DPCCH (High Speed Dedicated Physical Control Channel). The following parameters may characterize the frequency with which the CQI information is reported to the network. The first of these parameters may be CQI Feedback Cycle. This parameter may set a CQI feedback cycle value signaled to the communications terminal 300, which may control how often the communications terminal 300 transmits new CQI information on the uplink. A value of zero means that the communications terminal 300 does not transmit any CQI information. When CQI Feedback Cycle is not zero, it may be greater than or equal to (CQI Repetition Factor*2 ms). The second of these parameters may be CQI Repetition Factor. This parameter may set a CQI repetition factor signalled to the communications terminal 300, which may control how often the communications terminal 300 repeats CQI information on the uplink. In case of degraded UL, the CQI information does not reach the radio communications network. In order to increase the probability that the radio communications network receives CQI information, the radio communications network might react with decreasing the CQI Feedback Cycle or increasing the CQI Repetition Factor i.e. initiating in the communications terminal 300 to send CQI information more often. This change in the communications terminal 300 may be signaled via a Radio Bearer Reconfiguration on RRC (Radio Resource Control) level. Change of one of these, or both, values may be evaluated and interpreted by the determining circuit 406 as degraded UL conditions, and the determining circuit 406 may consequently provide the selection trigger to the selection circuit 304 to switch the transmit antenna. Provision of control information in the radio resource control (RRC) communication layer to the determining circuit 406 is indicated as "Mechanism Q" in FIG. 4.

The control information may include, or may be, control information for controlling an uplink data transmission parameter of the transmission of the transmit signal 508. For example, UL data transmission parameters may include grants (e.g. scheduling grants) and/or average ACK/NACKs. For example, in a HSUPA (High-Speed Uplink Packet Access) in a 3G communications network or in a PUSCH (Physical Uplink Shared Channel) in an LTE communications channel, a network component (e.g. NB) may provide the communications terminal 300 with a certain grant, which may include how much data the communications terminal 300 may transmit (e.g. by means of how often the communications terminal 300 may transmit, indicated by scheduling grants) and e.g. which modulation and coding scheme (MCS) may be used. Therefore, these grants may provide an indicator for the uplink link quality. The grants may also be impacted by other parameters like network load, e.g. resources available at the network component (e.g. NB) or the uplink multiple access scheme in general. The determining circuit 406 may determine the grant achieved for each antenna of the plurality of antennas 302a, 302b, and may use this to determine if the selection criterion is fulfilled. The selection circuit 304 may select the antenna which provides the better uplink grant, and may switch the antenna test-wise to evaluate the other antenna (see description below in respect of Mechanism K). In addition to the grant, the determining circuit 406 may also determine the average ACK/NACKs the communications terminal 300 receives for transmission of the transmit signal 508 on the different antennas. The ACK/NACKs also provide an indicator for the uplink quality and can be, for example, be combined with the grant. The grant may provide only an estimate of the uplink quality by the network component (e.g. NB), while the ACK/NACKs may give an indicator on the success of the uplink transmissions. Thus, average ACK/NACKs per antenna could also be used as a parameter by the selection circuit 304 to select the best transmit antenna. Provision of control information for controlling the UL data transmission parameters to the determining circuit 406 is indicated as "Mechanism R" in FIG. 4.

The communications terminal 300 may include at least one antenna tuning circuit 510 which may be configured to provide a feedback signal from the plurality of antennas 302a, 302b. The at least one antenna tuning circuit 510 may, for example, be used to detect whether an antenna of the plurality of antennas 302a, 302b is detuned, and may be further configured to re-tune a detuned antenna upon detection of such a detuned antenna. For example, objects, such as the user's hand or head, in the near field of an antenna can detune the antenna. Therefore, antennas may be equipped with an automatic tuning mechanism (e.g. an adaptive matching network), for example by means of the at least one antenna tuning circuit 510 that may aim at re-tuning the antenna. A feedback signal 512 from the plurality of antennas 302a, 302b, sent through the at least one antenna tuning circuit 510, could be used to identify a detuned antenna. The determining circuit 406 may determine a parameter of the feedback signal 512, and this parameter may be used to determine if the selection criterion is fulfilled. The parameter of the feedback signal 512 may include, or may be, an indication of a degree of detuning of an antenna of the plurality of antennas 302a, 302b. In other words, the determining circuit 406 may determine a degree of detuning of an antenna of the plurality of antennas 302a, 302b, and the degree of detuning of the antenna may be used to determine if the selection criterion is fulfilled. Assuming that the automatic tuning mechanism is not able to fully correct the detuning, the selection circuit 304 may avoid selecting a detuned antennas as the transmit antenna, or the least-detuned antenna could be selected as the transmit antenna. Provision of the feedback signal 512 to the determining circuit 406 is indicated as "Mechanism S" in FIG. 4.

In summary, the preceding examples show that the selection criterion may be based on control information that may, for example, be received from the radio communications network on the plurality of antennas 302a, 302b and/or on a feedback signal 512 received from the plurality of antennas 302a, 302b via, for example, at least one antenna tuning circuit 510. The description that follows provides examples which show how the determining circuit 406 may determine whether the selection criterion is fulfilled, and how the selection circuit 304 may select the transmit antenna based on the selection criterion.

As described above, the determining circuit 406 may compare values (e.g. a first value with at least one other value) to, for example, determine if the selection criterion is fulfilled and to consequently determine the best antenna to use as a transmit antenna. When comparing values (e.g. an antenna specific RSSI), an antenna whose value indicates a better channel quality (e.g. antenna with the higher RSSI) may always be selected as the transmit antenna. However, if the values for the antennas being compared are at least substantially equal (e.g. approximately identical), this could lead to a very frequent switching between or among the antennas being compared. This could have a negative impact on the link stability, for example, because the NodeB may see switching channel profiles. Therefore, in determining whether the selection criterion is satisfied or fulfilled, the determining circuit 406 may apply a threshold. For example the RSSI of a non-active antenna may differ from the RSSI of an active transmit antenna by at least the threshold before the non-active antenna is selected as the transmit antenna. In other words, the determining circuit 406 may be further configured to compare a value (e.g. value of a parameter of the receive signal 408) corresponding an antenna of the plurality of antennas 302a, 302b with the value (e.g. value of a parameter of the receive signal 408) corresponding to at least one other antenna of the plurality of antennas 302a, 302b. The selection criterion may be determined to be fulfilled if the values differ by at least a threshold. The threshold could be constant or depend on one or more other parameters.

Figure 5:
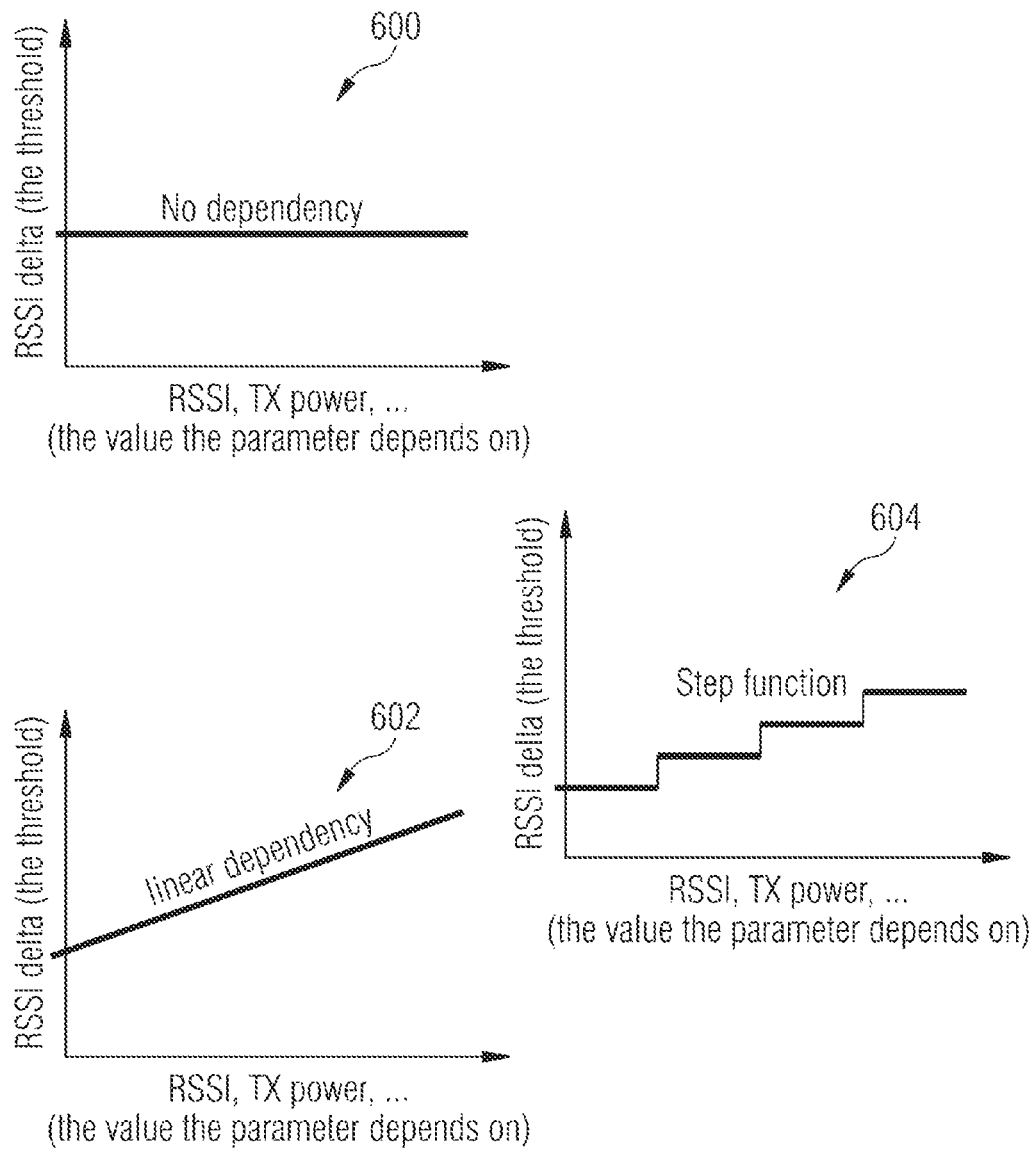
FIG. 5 shows various examples that illustrate a dependency of a threshold on a magnitude of a value.

FIG. 5 shows various examples that illustrate a dependency of the threshold on a magnitude of the value being considered.

The threshold may show no dependency on the magnitude of the value (e.g. in 600). The threshold may show a linear dependency on the magnitude of the value (e.g. in 602). The threshold may show a step dependency on the magnitude of the value (e.g. in 604). Other types of relationships between the threshold and the magnitude of the parameter may be possible (e.g. table look-up or any other kind of relationship or a combination, e.g. step-wise with linear dependency).

For example, the threshold may depend on a magnitude (e.g. absolute value) of the value. For example, in graph 602 of FIG. 5, the threshold could be larger for values with a high magnitude (e.g. a high RSSI) than for values with a low magnitude (e.g. a low RSSI). A high value (e.g. a high RSSI) may indicate that the channel conditions are most likely good, so that a transmit antenna switching is probably not needed.

By way of another example, the threshold may depend on, e.g., the currently requested transmit power as indicated by a power control mechanism (e.g. explicit closed-loop power control signaling from a NodeB). If the requested transmit power is high, the conditions in the UL may not be good, so it may be important to be on the better transmit antenna. Therefore, in this example, the threshold could be small to switch fast to the potentially better transmit antenna. While for a low transmit power, e.g. in good channel conditions, it may not be that critical. Thus, a slower switching would be acceptable and safe. A fast switching at high transmit power could also be advantageous for the power consumption. For example, a high transmit power may be a significant contribution to the overall power consumption of the communications terminal 300. Thus, when switching fast to a better transmit antenna, which requires less transmit power, one could save a measurable amount of power. For low transmit power the contribution of the transmit power to the overall power consumption is only small, so the potential reduction in power consumption is also only small. The use of a non-constant threshold by the determining circuit 406 to trigger selection of a transmit antenna is indicated as "Mechanism G" in FIG. 4.

The selection of the better transmit antenna (and then switching) could, e.g., take place when the requested transmit power reaches a certain level below the maximum transmit power. Accordingly, the threshold may include, or may be, a transmit power lower than the maximum transmit power. When the requested transmit power reaches this threshold, this may imply a bad situation or high demand (i.e. high UL throughput). Accordingly, there may be a need to conserve power by switching to a better transmit antenna may be beneficial. As described above, the values determined in the mechanisms described may give an indication which antenna might be a better transmit antenna. However, these are only predictions and the real performance of the transmit antenna is only known after switching to the antenna. Switching antennas when, for example, a requested transmit power of a current transmit antenna is greater than or equal to the above-described threshold leaves some head room in case the new transmit antenna is worse. Then one could switch back to the previous transmit antenna if one detects that the transmit power with the new transmit antenna is actually higher than on the previous transmit antenna. The use of a threshold including a transmit power lower than the maximum transmit power by the determining circuit 406 to trigger selection of a transmit antenna is indicated as "Mechanism H" in FIG. 4.

As described above in relation to Mechanism I, there may be a chance when a power consumed by a selected transmit antenna is actually worse than a previous transmit antenna. Therefore, one might limit the switching to non-critical scenarios, for example, where a worse performance on the new transmit antenna could be corrected by switching back to the previous transmit antenna without any severe impact on the system. Every transmit antenna switching may result in a short glitch of the transmitted signal. This may raise the potential need for an antenna tuning mechanism for the antennas, and a switched channel profile/estimation at the NodeB. To avoid any impact on important transmissions, the selection of the transmit antenna during transmission of important messages, e.g. control message (e.g. RLC retransmission) or other critical data may be blocked. In this regard, the communications terminal 300 may include a controller 514 configured to determine if a control message is exchanged between the plurality of antennas and the radio communications network. The controller 514 may be configured to provide the selection circuit 304 a block instruction 516 in case it determines that a control message is exchanged, the block instruction 516 for blocking a reselection of the transmit antenna. The provision of the block instruction 516 from the controller 514 to the selection circuit 304 is indicated as "Mechanism J" in FIG. 4.

The selection circuit 304 may select a new transmit antenna in regular intervals to check if the other antenna may be a better transmit antenna. In such an example, the determining circuit 406 may determine the transmit power requested of the new transmit antenna (e.g. after a short settling period), and in case the new transmit antenna is worse, the selection circuit 304 may switch back to a previous transmit antenna. If however, the new transmit antenna is better, switching may not be performed, and the determining circuit 406 may determine if a switch to another antenna is necessary after a time interval. The time interval may be depend on another parameter, e.g., in good channel conditions the time interval may be longer than in bad channel conditions. This procedure is indicated as "Mechanism K" in FIG. 4.

A decision to select and/or switch a transmit antenna may also depend on the state of the communications terminal 300. This could be a general state such as idle mode or connected mode. Or it could be a more detailed state like a HSUPA bearer established in 3G or a high throughput uplink bearer with LTE. A detailed state may also be usage scenario related, e.g., if a file upload (or download) is ongoing, a high or low rate streaming ongoing or some browsing/push mode. Depending on this, the selection circuit 304 could adapt, e.g., the time intervals of mechanism K or the thresholds described in mechanism G. The blocking of transmit antenna switching in mechanism J could also depend on the state, i.e., in certain states the blocking is done and in others not. This procedure is indicated as "Mechanism L" in FIG. 4.

So far it is assumed that the transmit antenna is selected independently of the active receive antennas. There may, however, be antennas that may be operated in duplex mode (i.e. transmit and receive simultaneously). There may be certain effects (positive or negative) if the receive is active as well on the transmit antenna. For example, there could be a small cross talk or there might be a small potential on reducing power consumption. Accordingly, the selection circuit 304 may take also into account which antenna is actively receiving, e.g., by applying a certain bias in the desired directions to the other mechanisms. This could be taken into account by the selection circuit 304 in selecting a transmit antenna. This procedure is indicated as "Mechanism M" in FIG. 4.

There may also be at least one external parameter, which could influence the selection of the transmit antenna. An external parameter may refer to a parameter (e.g. a measurement or another value), which may not be provided/ obtained by the RAT. For example, an external parameter could include an indication from a sensor of the communications terminal 300, which may detect (e.g. by means of proximity sensors) whether a hand/head/body of a user covers the communications terminal 300. Another external parameter may be a detection of whether external components are connected like USB, charger, headset, as these could also affect (usually degrade) antennas close to such connectors. An external parameter may include information of other RATs which also perform measurements, e.g., WIFI, Bluetooth or another cellular RAT which is measured for an InterRAT handover. An external parameter could include a general bias for a certain antenna, which may be a result of the design of the communications terminal 300 or of the plurality of antennas 302a, 302b of the communications terminal 300. The external parameter may be provided to the communications terminal 300 by an application processor and/or another processor and/or a controlling circuit (e.g. WiFi/Bluetooth, or info about the types of antennas built into the communications terminal 300). This procedure is indicated as "Mechanism N" in FIG. 4.

In FDD deployments, uplink and downlink transmissions may occur at different carrier frequencies which leads to non-identical channel realizations in downlink and uplink because the fading may depend on wavelength. In TDD deployments, in contrast, downlink and uplink transmissions are separated in time using the same frequency spectrum. In this case, the uplink and downlink channels can be regarded as perfectly reciprocal meaning that, e.g., the user perceives the same propagation channel from, for example, eNB antenna A to antenna 302a of the communications terminal 300 as the eNB perceives from antenna 302a to eNB antenna A. In case of TDD operation, the performance of the receive antennas measured in the downlink by means of RSSI/RSRP/RSRQ/SINR/channel matrix/etc. measurements as described above and below, can be applied with much higher confidence for the Tx antenna selection mechanism. As the transceiver chains in DL and UL at the communications terminal 300 and eNB might be different, even in TDD it might still be reasonable to aggregate multiple indicators. This procedure is indicated as "Mechanism T" in FIG. 4.

In the description that follows, the selection of more than one antenna as the transmit antenna is described.

Advanced wireless standards may have uplink transmission schemes which use more than one antenna, e.g., uplink 2×2 MIMO (multiple-input multiple-output) or uplink transmit diversity. Such devices could also have more than two receive antennas, e.g., for 4×4 MIMO downlink transmission or 3 receive antennas to increase downlink diversity. In such cases, the mechanisms presented above could be extended to select the two best transmit antennas out of, for example, the 4 available physical antennas. In general, this means that the mechanisms proposed above shall not be limited to certain number of transmit antennas or physical antennas. Special consideration may be given to closed loop uplink MIMO systems, since an applied precoding in the uplink depends on the uplink channel estimate at the base station receiver. Hence, the switching can consider relevant feedback timing loop constants. It may be possible to have interleaved antenna selections. For example, if the uplink precoding at transmission time interval n depends on the uplink channel estimation at uplink transmission time interval n-k, then k different selections may be interleaved. These transmission gaps may be used to switch selections. This procedure is indicated as "Mechanism O" in FIG. 4.

For operation with multiple receive antennas in the downlink, a communications terminal 300 operating in an LTE communications network may estimate the SIMO (Single-input multiple-output) or MIMO channel matrix based on the cell-specific reference symbols (CRS) or channel state information reference symbols (CSI-RS). Depending on the LTE transmission mode, the channel matrix may be used for determining the channel rank for rank indicator (RI) feedback and/or determining the precoding matrix indicator (PMI) feedback, and/or for MIMO equalization in, e.g. an MRC (maximum ratio combining) or MMSE (minimum means square error) receiver. In addition, the estimated channel matrix can also be used as an input for the transmit antenna selection. By applying a suitable operation like, e.g., a Frobenius norm on the rows of the channel matrix (assuming a receive-by-transmit layout of the channel matrix) and, potentially, using a time-averaging mechanism, the antenna(s) with the highest and lowest DL channel gain can be identified and the result can be considered for transmit antenna selection. This procedure is indicated as "Mechanism U" in FIG. 4.

Since Release 8 of the LTE standard, closed-loop transmit antenna selection from 2 possible transmit antennas may be an optional capability of the communications terminal 300, and this may be configured by the eNB. If closed-loop transmit antenna selection is enabled, the communications terminal 300 may alternate between the two antennas (called A and B here) for the transmission of uplink sounding reference symbols (SRS). Based on the measured UL SRS transmission quality of antenna A and B, the eNB selects antenna A and B for subsequent UL transmission and informs the communications terminal 300 by appropriately coding the uplink scheduling grant. This closed-loop antenna selection mechanism can be used to select the best N out of M transmit antennas (with N=1 out of M>2 being a special case for LTE Rel-8 and Rel-9 operation). In multiple phases the communications terminal 300 may select 2 out of the M transmit antennas per phase for SRS transmission. After a certain time period during which the eNB has measured the received quality in the communications terminal 300, a ranking between the 2 antennas of the currently chosen pair may be signaled in the uplink scheduling grants to the communications terminal 300 (potentially averaging over multiple grants). Using the ranking of a candidate transmit antenna pair as an ordering operator, an arbitrary sorting algorithm can be applied to identify the best N transmit antennas out of the total M available transmit antennas. An effect of exploiting the closed-loop transmit antenna selection feedback is that the transmit antenna selection is based on the actually perceived receive quality at the eNB. This procedure is indicated as "Mechanism V" in FIG. 4.

In LTE Release 10 and beyond, the communications terminal 300 can utilize multiple transmit antennas to transmit between 1 and 4 spatial layers by using a precoding matrix, which may be chosen from a pre-defined codebook by the eNodeB and signaled to the communications terminal 300 in the uplink scheduling grant. To facilitate the channel estimation at the eNB that allows to select the appropriate precoding matrix, the eNB requests uplink transmissions of antenna-specific sounding reference symbols (SRS) from the communications terminal 300. For the SRS transmission and for the layer-to-antenna mapping during the precoding operation, an antenna may be identified by its (logical) antenna port number (e.g., ports 20 and 21 for two available transmit antennas and ports 40, 41, 42, and 43 for four available transmit antennas). In a situation where the communications terminal 300 is equipped with more physical antennas than transmit chains or in cases where some of the transmit chains should be deactivated, a suitable subset of N<M transmit antennas from the total M available antennas may be selected. One way to select these N antennas, may be to alter the mapping of the logical antenna ports to the actual physical antennas for SRS transmission and then evaluate the closed-loop precoding feedback from the eNB. For example, for nearly ⅓ of all the rank-1 precoding matrices that could be selected by the eNB, the precoding matrices may contain zeros for certain antenna ports, i.e., the eNB indicates to disable a certain antenna port number. By alternating the mapping of N antenna ports to the M physical antennas and by gathering statistics over time, the communications terminal 300 may obtain an indication which physical antennas are seen as least suitable by the eNB. This procedure is indicated as "Mechanism W" in FIG. 4.

Whilst the various mechanisms may have been described separately, the communications terminal 300 may use two or more mechanisms (e.g. two, three, four, or more mechanisms (e.g. all mechanisms)) jointly in order to select the transmit antenna for the transmission to the radio communications network.

FIG. 6 shows a method 700 for selecting a transmit antenna for a transmission to a radio communications network. The method 700 may, for example, include: determining whether a selection criterion is fulfilled (in 702); and selecting at least one antenna of the plurality of antennas as the transmit antenna in case the selection criterion is determined to be fulfilled (in 704).

According to various examples described herein, a communications terminal may be provided. The communications terminal may include: a plurality of antennas; and a selection circuit configured to select at least one antenna of the plurality of antennas as a transmit antenna for a transmission to a radio communications network, wherein a selection of the transmit antenna may be based on a selection criterion.

The selection criterion may be based on a parameter of a receive signal received from the radio communications network on the plurality of antennas.

The parameter of the receive signal may include a power of the receive signal.

The power of the receive signal may include a total power of the receive signal.

The receive signal may include a reference signal, and the parameter of the receive signal may include a power of the reference signal.

The receive signal may include a reference signal and noise, and the parameter of the receive signal may include a ratio of a power of the reference signal to a power of the noise.

The receive signal may be received on the plurality of antennas over a plurality of frequencies, the parameter of the receive signal may include a plurality of frequency-specific parameters, each frequency-specific parameter of the plurality of frequency-specific parameters may be the parameter of the receive signal received on a respective frequency or frequency band of the plurality of frequencies, and the selection criterion may be based on at least one frequency-specific parameter.

The plurality of antennas may be configured to receive a receive trigger, the receive trigger for triggering each antenna of the plurality of antennas to receive the receive signal at the same time.

The plurality of antennas may be configured to receive the receive trigger in case previously determined parameters of the receive signal are determined to be outdated.

The selection criterion may be based on the parameter of the receive signal received from a radio cell of the radio communications network, wherein the radio cell may be a cell specified in a handover request sent by the communications terminal to the radio communications network.

The selection criterion may be based on control information received from the radio communications network on the plurality of antennas, the control information for controlling a transmission of a transmit signal on the plurality of antennas.

The control information may include power control information, the power control information for controlling a transmission power of the transmit signal on the plurality of antennas.

The selection criterion may be based on a comparison of the transmission power of the transmit signal prior to selecting the transmit antenna and the transmission power of the transmit signal after selecting the transmit antenna.

The selection circuit may be further configured to reselect at least one antenna of the plurality of antennas as a new transmit antenna in case the transmission power of the transmit signal after selecting the transmit antenna is greater than the transmission power of the transmit signal prior to selecting the transmit antenna.

The control information may include control information in a radio link control (RLC) communication layer.

The control information may include control information in a radio resource control (RRC) communication layer.

The control information in the radio resource control (RRC) communication layer may include channel quality information (CQI) reporting configuration settings.

The channel quality information (CQI) reporting configuration settings may include a frequency with which the channel quality information (CQI) is reported to the radio communications network.

The control information may be for controlling an uplink data transmission parameter of the transmission of the transmit signal on the plurality of antennas.

The uplink data transmission parameter may include a scheduling grant.

The selection criterion may be based on a parameter of a feedback signal received from the plurality of antennas.

The feedback signal may include an antenna detuning feedback signal.

The parameter of the feedback signal may include a degree of detuning of an antenna of the plurality of antennas.

The feedback signal may be received from the plurality of antennas via an antenna tuning circuit.

The communications terminal may further include the antenna tuning circuit.

The selection criterion may be determined to be fulfilled in case a difference between a first value and at least one other value is greater than or equal to a threshold.

The first value and the at least one other value may include a value of a parameter of a receive signal received from the radio communications network on the plurality of antennas.

The first value and the at least one other value may include a value of control information for controlling a transmission of a transmit signal on the plurality of antennas.

The first value and the at least one other value may include a value of a parameter of a feedback signal received from the plurality of antennas.

The threshold may depend on a magnitude of the first value or the at least one other value or the first value and the at least one other value.

The threshold may depend on a maximum transmit power of the plurality of antennas.

The communications terminal may further include: a controller configured to provide a block instruction to the selection circuit, the block instruction for blocking the reselection of the transmit antenna by the selection circuit.

The controller may be configured to provide the block instruction to the selection circuit in case a control message is transmitted via the plurality of antennas.

The selection circuit may be configured to select the at least one antenna of the plurality of antennas as the transmit antenna at regular intervals of time.

The controller may be configured to provide the block instruction to the selection circuit based on a state of the communications terminal.

The selection of the transmit antenna may be based on the selection criterion and on information indicating which antenna of the plurality of antennas is receiving.

The selection criterion may be based on an external parameter determined by the communications terminal by a means other than a radio access technology.

The external parameter may be determined by at least one of an application processor and a controlling circuit, which may be included in the communications terminal.

The external parameter may include an indication of whether an antenna of the plurality of antennas is covered by an object.

The indication may be provided by a proximity sensor.

The external parameter may be an indication of whether a device is connected to the communications terminal.

The device may include at least one of a universal serial bus (USB) device, a headset and a charger.

The external parameter may include information of a radio access technology.

The external parameter may include an indication of which antenna of the plurality of antennas is preferred as the transmit antenna.

The selection circuit may be configured to select at least two antennas of the plurality of antennas as transmit antennas for the transmission to the radio communications network.

The selection of the transmit antennas may be based on an estimated downlink channel matrix.

The selection of the transmit antennas may be based on a closed-loop transmit antenna selection feedback from the radio communications network.

The selection of the transmit antennas may be based on a closed-loop precoding feedback from the radio communications network.

According to various examples described herein, a method for selecting a transmit antenna for a transmission to a radio communications network may be provided. The method may include: determining whether a selection criterion is fulfilled; and selecting at least one antenna of the plurality of antennas as the transmit antenna in case the selection criterion is determined to be fulfilled.

Determining whether the selection criterion is fulfilled may include: comparing a value of a first signal with a value of a at least one other signal, and the selection criterion may be determined to be fulfilled based on the comparison.

Various examples and aspects described in the context of one of the devices or methods described herein may be analogously valid for the other devices or methods described herein.

While various aspects have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communications terminal, comprising:
a plurality of antennas; and
a selection circuit configured to dynamically select at least one antenna of the plurality of antennas as a transmit antenna for a transmission to a radio communications network, wherein a selection of the transmit antenna is based on a selection criterion,
wherein the communication terminal receives control information, for controlling a transmission of a transmit signal via the plurality of antennas, from the radio communications network,
wherein the control information comprises power control information that indicates a requested transmission power for the transmission of the transmit signal via the plurality of antennas;
a determining circuit configured to, based on the control information, configured to compare the requested transmission power of the transmit signal before selecting the at least one antenna to the requested transmission power of the transmit signal after selecting the at least one antenna, and
determining whether there has been a condition change in one or more of a measured receive signal strength indicator (RSSI), a measured receive signal code power (RSCP) and a measured reference signal receive power (RSRP),
wherein the selection circuit is further configured to reselect at least one antenna of the plurality of antennas as the transmit antenna if a result of the comparison of the requested transmission power before selecting the at least one antenna to the requested transmission power of the transmit signal after selecting the at least one antenna indicates that the requested transmission power of the transmit signal after selecting the at least one antenna is greater than the requested transmission power of the transmit signal before selecting the at least one transmit antenna and subject to cross-checking the result of the comparison of the requested transmission power before selecting the at least one antenna to the transmission power of the transmit signal after selecting the at least one antenna based on the determined condition change.

2. The communications terminal of claim 1, wherein the selection criterion is based on a parameter of a receive signal received from the radio communications network on the plurality of antennas.

3. The communications terminal of claim 2, wherein the parameter of the receive signal comprises a power of the receive signal.

4. The communications terminal of claim 3, wherein the power of the receive signal comprises a total power of the receive signal.

5. The communications terminal of claim 2, wherein the receive signal comprises a reference signal, and wherein the parameter of the receive signal comprises a power of the reference signal.

6. The communications terminal of claim 2, wherein the receive signal comprises a reference signal and noise, and wherein the parameter of the receive signal comprises a ratio of a power of the reference signal to a power of the noise.

7. The communications terminal of claim 2, wherein the receive signal is received on the plurality of antennas over a plurality of frequencies, wherein the parameter of the receive signal comprises a plurality of frequency-specific parameters, wherein each frequency-specific parameter of the plurality of frequency-specific parameters is the parameter of the receive signal received on a respective frequency or frequency band of the plurality of frequencies, and wherein the selection criterion is based on at least one frequency-specific parameter.

8. The communications terminal of claim 2, wherein the plurality of antennas is configured to receive a receive trigger, the receive trigger for triggering each antenna of the plurality of antennas to receive the receive signal at the same time.

9. The communications terminal of claim 8, wherein the plurality of antennas is configured to receive the receive trigger in case previously determined parameters of the receive signal are determined to be outdated.

10. The communications terminal of claim 2, wherein the selection criterion is based on the parameter of the receive signal received from a radio cell of the radio communications network, wherein the radio cell is a cell specified in a handover request sent by the communications terminal to the radio communications network.

11. The communications terminal of claim 1, wherein the control information comprises control information in a radio link control (RLC) communication layer.

12. The communications terminal of claim 1, wherein the control information comprises control information in a radio resource control (RRC) communication layer.

13. The communications terminal of claim 12, wherein the control information in the radio resource control (RRC) communication layer comprises channel quality information (CQI) reporting configuration settings.

14. The communications terminal of claim 13, wherein the channel quality information (CQI) reporting configuration settings comprises a frequency with which the channel quality information (CQI) is reported to the radio communications network.

15. The communications terminal of claim 1, the control information for controlling an uplink data transmission parameter of the transmission of the transmit signal on the plurality of antennas.

16. The communications terminal of claim 15, wherein the uplink data transmission parameter comprises a scheduling grant.

17. The communications terminal of claim 1, wherein the selection criterion is based on a parameter of a feedback signal received from the plurality of antennas.

18. The communications terminal of claim 17, wherein the feedback signal comprises an antenna detuning feedback signal.

19. The communications terminal of claim 18, wherein the parameter of the feedback signal comprises a degree of detuning of an antenna of the plurality of antennas.

20. The communications terminal of claim 17, wherein the feedback signal is received from the plurality of antennas via an antenna tuning circuit.

21. The communications terminal of claim 1, wherein the selection criterion is determined to be fulfilled in case a difference between a first value and at least one other value is greater than or equal to a threshold.

22. The communications terminal of claim 21, wherein the first value and the at least one other value comprise a value of a parameter of a receive signal received from the radio communications network on the plurality of antennas.

23. The communications terminal of claim 21, wherein the first value and the at least one other value comprise a value of control information for controlling a transmission of a transmit signal on the plurality of antennas.

24. The communications terminal of claim 21, wherein the first value and the at least one other value comprise a value of a parameter of a feedback signal received from the plurality of antennas.

25. The communications terminal of claim 21, wherein the threshold depends on a magnitude of the first value or the at least one other value or the first value and the at least one other value.

26. The communications terminal of claim 21, wherein the threshold depends on a maximum transmit power of the plurality of antennas.

27. The communications terminal of claim 1, further comprising:
a controller configured to provide a block instruction to the selection circuit, the block instruction for blocking the reselection of the transmit antenna by the selection circuit.

28. The communications terminal of claim 27, wherein the controller is configured to provide the block instruction to the selection circuit in case a control message is transmitted via the plurality of antennas.

29. The communications terminal of claim 27, wherein the controller is configured to provide the block instruction to the selection circuit based on a state of the communications terminal.

30. The communications terminal of claim 1, wherein the selection circuit is configured to select the at least one antenna of the plurality of antennas as the transmit antenna at regular intervals of time.

31. The communications terminal of claim 1, wherein the selection of the transmit antenna is based on the selection criterion and on information indicating which antenna of the plurality of antennas is receiving.

32. The communications terminal of claim 1, wherein the selection criterion is based on an external parameter determined by the communications terminal by a means other than a radio access technology.

33. The communications terminal of claim 32, wherein the communications terminal comprises at least one of an application processor and a controlling circuit, and wherein the external parameter is determined by at least one of the application processor and the controlling circuit.

34. The communications terminal of claim 32, wherein the external parameter comprises an indication of whether an antenna of the plurality of antennas is covered by an object.

35. The communications terminal of claim 34, wherein the indication is provided by a proximity sensor.

36. The communications terminal of claim 32, wherein the external parameter comprises an indication of whether a device is connected to the communications terminal.

37. The communications terminal of claim 36, wherein the device comprises at least one of a universal serial bus (USB) device, a headset and a charger.

38. The communications terminal of claim 32, wherein the external parameter comprises information of a radio access technology.

39. The communications terminal of claim 32, wherein the external parameter comprises an indication of which antenna of the plurality of antennas is preferred as the transmit antenna.

40. The communications terminal of claim 1, wherein the selection circuit is configured to select at least two antennas of the plurality of antennas as transmit antennas for the transmission to the radio communications network.

41. The communications terminal of claim 40, wherein the selection of the transmit antennas is based on an estimated downlink channel matrix.

42. The communications terminal of claim 40, wherein the selection of the transmit antennas is based on a closed-loop transmit antenna selection feedback from the radio communications network.

43. The communications terminal of claim 40, wherein the selection of the transmit antennas is based on a closed-loop precoding feedback from the radio communications network.

44. A method for selecting a transmit antenna of a communications terminal comprising a plurality of antennas and a selection circuit, for a transmission to a radio communications network, the method comprising:
determining, by the selection circuit, whether a selection criterion is fulfilled; and
dynamically selecting at least one antenna of the plurality of antennas as the transmit antenna if the selection criterion is fulfilled,
wherein determining whether the selection criterion is fulfilled comprises comparing a requested transmission power of a transmit signal via the plurality of antennas before selecting the transmit antenna to the requested transmission power of the transmit signal after selecting the transmit antenna, determining whether there has been a condition change in one or more of a measured receive signal strength indicator (RSSI), a measured receive signal code power (RSCP) and a measured reference signal receive power (RSRP) and cross-checking a result of the comparison of the requested transmission power before selecting the at least one antenna to the requested transmission power of the transmit signal after selecting the at least one antenna based on the determined condition change.

* * * * *